Oct. 9, 1951       J. G. McKINLEY        2,570,259
METHOD OF AND APPARATUS FOR THE MANUFACTURE
OF FLEXIBLE CONDUITS
Filed Jan. 22, 1949
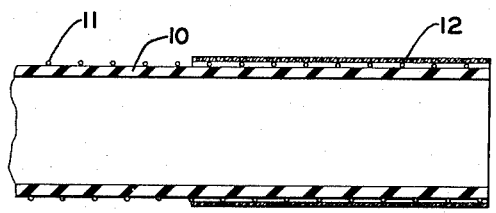
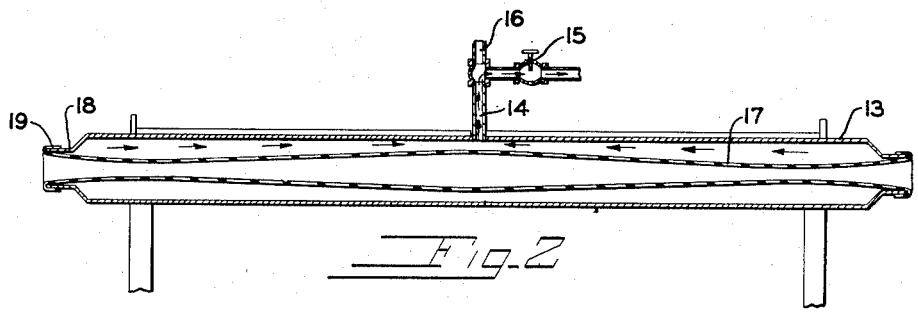
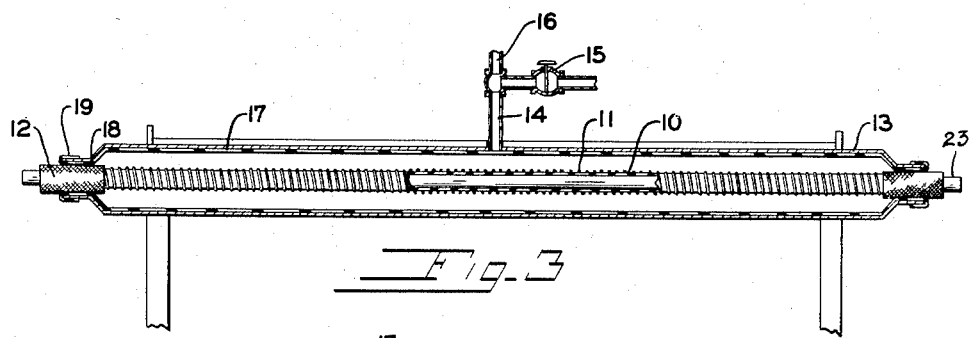
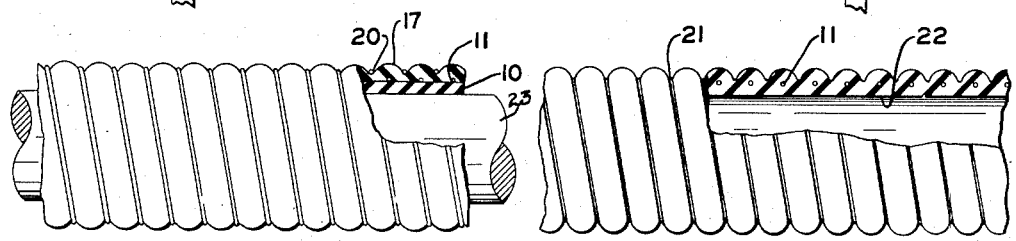
INVENTOR.
JAMES G. McKINLEY
BY
ATTY Patented Oct. 9, 1951

2,570,259

UNITED STATES PATENT OFFICE 2,570,259

METHOD OF AND APPARATUS FOR THE MANUFACTURE OF FLEXIBLE CONDUITS

James G. McKinley, Waynesville, N. C., assignor to The Dayton Rubber Company, a corporation of Ohio Application January 22, 1949, Serial No. 72,236

6 Claims. (Cl. 154—5)

The present invention relates to a method and apparatus for the manufacture of a new and improved type of flexible conduit or hose. More particularly it relates to a method and apparatus for the manufacture of flexible rubber hose especially adapted to convey fluids under suction or pressure with or without solids suspended therein.

Flexible hose or tubing is frequently used for carrying fluids either with or without finely divided material suspended therein. Such uses include transportation of grain or finely divided materials such as dust, by means of carrier gases or suction, as well as the conduction of fluids under pressure as, for example, in carrying compressed air into pneumatic tools. Liquids may also be conveyed in similar tubing. In these applications it is highly desirable to provide hose or conduits having a high degree of strength and flexibility.

An important use of flexible hose is in connection with vacuum cleaners which are used in homes. A conventional type of vacuum cleaner hose is constructed with a spirally wound steel wire placed on the very inside of the hose. This hose is usually made by winding the wire on a steel mandrel which is held in place and caused to revolve. Immediately on top of the wire is placed a single layer of bias cut, rubber coated, square woven fabric. Next on top of the fabric and equidistant between turns of wire, is placed one strand of a low grade burlap yarn. The assembly described above is then vulcanized and subsequently removed from the mandrel. The vulcanized hose then has an outside braided covering applied. This operation is usually carried out by what is commonly known as a 64 carrier vertical hose braiding machine. Fittings are then applied to each end of the hose for connection to the appliance and to the tool.

The conventional type of hose referred to has numerous disadvantages. In the first place, the interior of the hose has an uneven surface due to the location of the spiral reinforcement which means that the hose becomes subject to clogging and abrasion by particles carried by the fluid. Furthermore, the broaded outer surface tends to abrade readily and will, after a period of time, present an unsightly appearance. The wire reinforcement, being positioned on the inner surface of the hose, tends to separate from the rubber or fabric at points of strain. This type of hose also is not as flexible as it should be due to the fabric construction. Furthermore, the use of fabric necessitates the existence of one or more spiral seams and a longitudinal seam which are localities of weak construction. In addition, the fabric construction tends to permit a certain amount of leakage of air.

In applicant's co-pending application Serial No. 19,798 filed April 8, 1948, of which this application is a continuation-in-part, there is described a novel type of hose having smooth inner and outer surfaces composed of natural or synthetic rubbers with the outer surface having a corrugated structure, together with a method for the manufacture of such hose.

In accordance with the method described in the above mentioned co-pending application, a wire helix is spun over a seamless rubber tube which is mounted on a mandrel, and over this helix is thereafter positioned an outer rubber tube. This is accomplished by the use of air as described in the aforementioned application. The present invention is primarily directed to an improved method for applying the outer tube by the application of differential pressure together with an apparatus for carrying out said method. The new method permits more rapid application of the outer cover in a more closely fitting manner as will be apparent from the description of the process herein.

It is therefore an object of the present invention to describe an improved method and apparatus for the manufacture of a highly flexible rubber conduit. It is a further object of the present method to provide a method and apparatus for the application of a flexible covering upon a member positioned concentric thereto. It is a further object of the present invention to provide a novel method and apparatus for the application of a tubular rubber cover upon another tubular member concentric therewith. Further objects will be apparent from the present disclosure.

The accompanying drawing illustrates the preferred manner of carrying out the present invention.

In the drawings:

Fig. 1 is a longitudinal cross section through one end of the inner portion of the hose of the present invention at one stage of the process.

Fig. 2 is a vertical longitudinal cross section through the vacuum apparatus of the present invention showing the outer layer of the hose positioned therein.

Fig. 3 is a vertical cross section as in Fig. 2 showing the inner and outer portions of the hose in place prior to release of the vacuum.

Fig. 4 is a view in elevation, partially in cross section showing a segment of the assembled hose of the invention prior to vulcanization.

Fig. 5 is a view in elevation, partially in cross section of a segment of the complete hose of the present invention.

The hose or conduit is formed in straight lengths in the following manner:

An inner tube composed of raw or partially cured rubber is formed by extrusion and has the desired inner diameter and thickness. The tube is blown upon an elongated pole or mandrel of the desired length by positioning the end of the tube over the end of the mandrel and then forcing air into the outer end of the tube thus permitting the tube to be readily positioned over the mandrel. The diameter of the mandrel conforms substantially to the inner diameter of the tube. The resulting structure is illustrated in Fig. 3 where inner tube 10 is shown positioned upon mandrel 23. The outer surface of the inner tube is then wiped clean with a solvent such as naphtha in order to remove soapstone or other material which may remain on the surface thereof. A wire helix 11 is then spun over the rubber covered mandrel to provide a wire helix shown in Fig. 3. The wire is preferably of steel and may be of any desired gauge depending on the ultimate strength and flexibility desired in the hose. It is wound under a certain amount of tension so that the helix firmly engages the rubber tube. Where it is necessary to reinforce the ends of the hose, as in cases where it is desired to apply hose fittings thereto, a layer of fabric 12 may be applied over each end of the helix for a relatively short distance, say from a few inches to a foot or so. A cross sectional view of the end of the inner tube with the wire helix and fabric reinforcement in place is shown in Fig. 1. Preferably, the fabric is applied by winding a bias cut fabric strip over the end of the tube to give a spiral overlapping splice.

The outer cover tube 17 is then prepared for application to the inner member. This tube which is of desired rubber composition, is formed by extrusion or otherwise and has an inner diameter conforming to the outer diameter of the inner tube and is of a desired thickness. This tube is preferably partially cured and is blown on to a mandrel of the desired diameter in a manner similar to that described above in connection with the inner tube. The surface is thoroughly washed with a solvent and then completely coated with a rubber cement which is allowed to dry thoroughly. After the cement dries the tube is dusted with zinc stearate. The tube is then stripped from the mandrel by drawing over itself from one end so that the tube is turned inside out with the cemented surface on the inside.

Tube 17 which now has a cement layer on the interior thereof is then introduced into the vacuum apparatus illustrated in Fig. 2. This apparatus includes an elongated chamber 13 connected by pipe 14 and valve 15 to a means for creating suction. Pipe 16 is connected to a valve which may be closed when suction is applied and opened when it is desired to release the vacuum. Chamber 13 is designed to have a diameter slightly greater than that of the tube and tapers to openings 18 which are approximately the same diameter as the tube. Tube 17 is positioned through the vacuum chamber and one end 19 of the tube is turned up over the end of the chamber 18. The tube is stretched and the opposite end is then turned over the other end of the chamber as shown in Fig. 2, preferably while in a slightly stretched condition. In this way the tube is secured at both ends and the space between the outer surface of the tube and the inner surface of the chamber forms a closed zone permitting the retention of a vacuum. Conduit 16 is then closed off by means of a valve not shown and valve 15 is opened and the suction turned on in order to exhaust the air in the space between the outer tube and the inner wall of the chamber thereby reducing pressure and creating a vacuum in the space. This causes the tube to be drawn out uniformly against the inner wall of 13 as shown in Fig. 3. At this stage mandrel 23 having inner tube 10, helix 11 and fabric reinforcements 12 supported thereon, is shoved into chamber 13 concentric with outer cover 17 which remains drawn against the wall of chamber 13. This is shown in Fig. 3. After the mandrel has been properly positioned, the vacuum apparatus is shut off and the vacuum released, the pressure in the space being thereby increased, and the ends of the outer tube 19 are pulled back over the fabric covered ends of the tube. At this point the outer tube 17 is firmly collapsed over the wire helix and the inner tube 10 by release of the vacuum with resultant pressure increase as referred to above. The whole assembly is then removed from the vacuum pipe and is placed in the chuck of a cording lathe. A wire helix 20 is then spun over the outer cover spaced between the convolutions of inner helix. The tension of the wire is adjusted so as to force the outer cover between convolutions of the inner helix to the desired depth. The fact that the outer cover has been partially cured prevents the wire from cutting into the cover. The outer wire is secured at both ends of the mandrel to maintain its tension and to prevent it from coming loose during subsequent handling. The resulting assembly then has the structure shown in cross section in Fig. 4. The assembled hose on the mandrel is then cured in a steam chamber in a conventional manner for the desired length of time and after curing is removed and allowed to cool thoroughly, after which the assembly is placed in the unwinding chuck of a spinning lathe and the outer wire helix 20 is removed. The hose is then stripped from the mandrel and the necessary fittings are applied. The final product has a cross section as shown in Fig. 5 in which the inner and outer tubes have become composited into a unitary member with helix 11 firmly embedded therein. The outer surface is corrugated as shown at 21 and the inner surface is completely smooth as shown at 22.

Preferably, the wire which has been removed from the outer cover after curing is utilized in a subsequent operation to form the inner helix 11 of another tube as described in my aforesaid copending application.

The tubes of which the product is formed may be composed of either natural rubber or synthetic rubber, such synthetic rubber including synthetic rubber-like materials of the type represented by Buna-S, Buna-N, neoprene and the like. In general such synthetic rubbers are formed by the polymerization of conjugated diolefins or their co-polymerization with other monomers; such as, styrene, acrylonitrile or other unsaturated materials co-polymerizable therewith. The term "rubber" as used herein is intended to and does apply to both natural and synthetic rubbers or mixtures thereof as is well known to the art. The tubes may be entirely unvulcanized or "green" or may be partially or fully vulcanized and, of course, contain any necessary compounding materials, vulcanizing agents, accelerators and the like, as is well known to the art.

A typical natural rubber composition for use in manufacturing either or both layers of the hose is as follows (in parts by weight).

| | |
|---|---|
| Rubber smoked sheet | 100. |
| Sulfur | 2.50 |
| Hard clay | 50.00 |
| Zinc oxide | 3.50 |
| Iron oxide | 10.00 |
| Stearic acid | 1.50 |
| Benzothiazol disulfide | 1.25 |
| Phenyl-beta-naphthylamine | 1.00 |

Other conventional formulations for both natural and synthetic rubbers, as well known to the art, may be utilized.

The forms of the invention described herein are for the purpose of illustration and example and only such limitations should be improved on the invention as are set forth in the appended claims.

I claim:

1. A method for the manufacture of rubber conduit which comprises positioning an inner rubber tube upon an elongated mandrel, introducing an outer rubber tube dimensioned to fit said inner tube closely within an elongated cylindrical chamber coextensive therewith and having a slightly greater diameter to provide a space between the outer surface of the outer tube and the inner surface of the chamber, closing off said space near the ends of the outer tube, reducing pressure by creating a vacuum within said space to draw the outer tube against the inner surface of the chamber, introducing said inner tube on said mandrel internally of the outer tube and coaxially therewith while maintaining said reduced pressure, releasing said vacuum and increasing said pressure to release said outer tube thereby permitting it to contract around said inner tube, vulcanizing the inner and outer tubes together, and removing said assembled inner and outer tubes from said mandrel.

2. The method for the manufacture of a flexible rubber conduit which comprises positioning an at least partially unvulcanized inner rubber tube upon an elongated mandrel, winding a spaced helical reinforcing member around said inner rubber tube, introducing an outer rubber tube dimensioned to fit closely over said inner tube and said reinforcing member into an elongated chamber open at both ends substantially coextensive therewith and having an internal diameter greater than the external diameter of the outer tube to provide a space therebetween, closing said space adjacent the ends of said outer tube, reducing the pressure within said space sufficiently to draw said outer tube against the inner walls of said chamber, introducing said inner tube upon said mandrel together with said helical reinforcement into said outer tube substantially coaxially thereof and coextensive therewith, increasing said pressure to release said outer tube around said inner tube and reinforcement, removing the resultant assembly from the chamber, wrapping said outer cover with a helical winding spaced between convolutions of said inner reinforcing member to force said outer tube between said convolutions, and vulcanizing said wrapped assembly to provide a unitary structure.

3. A method according to claim 5 wherein the sealing of the space between the chamber and the outer tube is effected by turning the ends of the tube over the ends of the chamber.

4. A method according to claim 5 wherein the outer helical winding is removed subsequent to vulcanization.

5. A method according to claim 6 wherein a reinforcing fabric layer is positioned over said inner tube and said helical reinforcement for a relatively short distance at each end of the tube prior to application of the outer tube.

6. Apparatus for the application of flexible tubular coverings to an elongated cylindrical member which comprises a cylindrical chamber open at both ends having an internal diameter greater than that of the covering member and a length slightly less than said covering member, said cylindrical chamber terminating at each end into a portion having a diameter substantially that of the covering member whereby a space is defined between said tubular covering and said chamber when said covering is disposed within said chamber with the ends of said covering projecting therefrom and the ends thereof are turned over the ends of said chamber, and means for exhausting air from said space to reduce the pressure therein and draw the cover member against the inside wall of said chamber.

JAMES G. McKINLEY.

REFERENCES CITED

The following references are of record in the file of this patent:

UNITED STATES PATENTS

| Number | Name | Date |
|---|---|---|
| 2,201,706 | Sukohl | May 21, 1940 |
| 2,272,704 | Harding | Feb. 10, 1942 |
| 2,446,281 | Harding | Aug. 3, 1948 |